United States Patent
Yun

(10) Patent No.: US 10,152,166 B2
(45) Date of Patent: Dec. 11, 2018

(54) DISPLAY DEVICE USING SEMICONDUCTOR LIGHT EMITTING DEVICE

(71) Applicant: LG ELECTRONICS INC., Seoul (KR)

(72) Inventor: Yeomin Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 15/152,738

(22) Filed: May 12, 2016

(65) Prior Publication Data

US 2016/0349903 A1 Dec. 1, 2016

(30) Foreign Application Priority Data

May 27, 2015 (KR) .................. 10-2015-0074231

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04102* (2013.01)

(58) Field of Classification Search
CPC combination set(s) only.
See application file for complete search history.

(56) References Cited

U.S. PATENT DOCUMENTS

| | | |
|---|---|---|
| 2011/0254802 A1 | 10/2011 | Philipp |
| 2012/0062470 A1 | 3/2012 | Chang |
| 2012/0092293 A1 | 4/2012 | Ganapathi et al. |
| 2013/0176273 A1 | 7/2013 | Li et al. |
| 2013/0278560 A1* | 10/2013 | Yamaguchi ............. G06F 3/044 345/174 |
| 2014/0225838 A1* | 8/2014 | Gupta ................... G06F 3/0412 345/173 |
| 2014/0225841 A1 | 8/2014 | Sultenfuss et al. |

* cited by examiner

*Primary Examiner* — Jennifer Mehmood
*Assistant Examiner* — Deeprose Subedi
(74) *Attorney, Agent, or Firm* — Birch, Stewart, Kolasch & Birch, LLP

(57) ABSTRACT

A display device including a display including a plurality of semiconductor light emitting devices; a touch sensor including touch sensing lines disposed to overlap with the plurality of semiconductor light emitting devices, and arranged to cross each other to sense a touch input; and a controller configured to sequentially drive the touch sensor to sense a touch input and the display to control the semiconductor light emitting devices. Further, a driving mode of the touch sensor includes a first driving mode in which part of the touch sensing lines are turned on, and a second driving mode in which at least part of touch sensing lines turned off in the first driving mode are additionally turned on when the touch input is sensed in the first driving mode.

18 Claims, 15 Drawing Sheets

(a)   (b)

DISPLAY DEVICE USING SEMICONDUCTOR LIGHT EMITTING DEVICE

CROSS-REFERENCE TO RELATED APPLICATIONS

Pursuant to 35 U.S.C. § 119(a), this application claims the benefit of earlier filing date and right of priority to Korean Application No. 10-2015-0074231, filed on May 27, 2015, the contents of which is incorporated by reference herein in its entirety.

BACKGROUND OF THE INVENTION

1. Field of the Invention

The present disclosure relates to a display device, and more particularly, to a display device using a semiconductor light emitting device.

2. Description of the Related Art

In recent years, display devices having excellent characteristics such as low profile, flexibility and the like have been developed in the display technical field. On the contrary, currently commercialized main displays are represented by liquid crystal displays (LCDs) and active matrix organic light emitting diodes (AMOLEDs). However, there exist problems such as not-so-fast response time, difficult implementation of flexibility in case of LCDs, and there exist drawbacks such as short life span, not-so-good yield as well as low flexibility in case of AMOLEDs.

Further, light emitting diodes (LEDs) are well known light emitting devices for converting an electrical current to light, and have been used as a light source for displaying an image in an electronic device including information communication devices since red LEDs using GaAsP compound semiconductors were made commercially available in 1962, together with a GaP:N-based green LEDs. Accordingly, the semiconductor light emitting devices may be used to implement a flexible display, thereby presenting a scheme for solving the problems.

Furthermore, for such a display device, the development of thin film display technologies has been played an important role while accelerating its slimming process. In addition, the development of a touch screen which is controllable using a finger, a pen or the like on a display screen is an important part of modern industry. Meanwhile, in a typical operation of the touch screen, it is driven by dividing a driving time thereof into a display driving time and a touch driving time, but a touch circuit thereof is not driven during the display driving time because of having a high probability of failure during touch recognition since display panel noise is induced to a touch sensor.

Furthermore, the display is not driven to perform touch recognition during the touch driving time. However, in case of such a time division approach, since the display is unable to emit light during the touch driving time, a light-emitting time within a unit frame decreases and a display maximum luminance decreases. Moreover, as increasing the resolution of a display panel, a touch sensing time also increases in proportion thereto, and therefore, it is very important to properly divide a driving period of the display panel and the touch sensor within a unit frame.

SUMMARY OF THE INVENTION

An object of the present disclosure is to provide a new type of touch sensor driving method capable of minimizing a touch sensing time within a unit frame.

Another object of the present disclosure is to provide a new driving method for a display panel and a touch sensor capable of securing a driving period of the display panel to the maximum extent to increase the luminance of the display panel.

In order to accomplish the foregoing objects, a display device according to the present disclosure may include a display including a plurality of semiconductor light emitting devices, a touch sensor including touch sensing lines disposed to overlap with the plurality of semiconductor light emitting devices, and arranged to cross each other to sense a touch input, and a controller configured to drive the touch sensor to sense a touch input, and drive the display to control the semiconductor light emitting devices, wherein the controller sequentially drives the display and the touch sensor, and a driving mode of the touch sensor includes a first driving mode in which part of the touch sensing lines are turned on, and a second driving mode in which at least part of touch sensing lines turned off in the first driving mode are additionally turned on when the touch input is sensed in the first driving mode.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
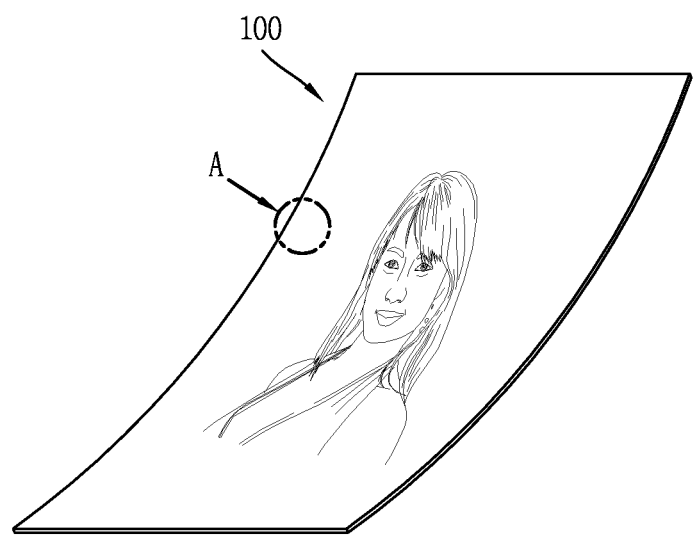
FIG. 1 is a conceptual view illustrating a display device using a semiconductor light emitting device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, it should be noted that the accompanying drawings are merely illustrated to easily explain the concept of the invention, and therefore, they should not be construed to limit the technological concept disclosed herein by the accompanying drawings.

Furthermore, when an element such as a layer, region or substrate is referred to as being "on" another element, it can be directly on the other element or an intermediate element may also be interposed therebetween.

A display device disclosed herein includes a portable phone, a smart phone, a laptop computer, a digital broadcast terminal, a personal digital assistant (PDA), a portable multimedia player (PMP), a navigation, a slate PC, a tablet PC, an ultrabook, a digital TV, a desktop computer, and the like. However, it would be easily understood by those skilled in the art that a configuration disclosed herein may be applicable to any displayable device even though it is a new product type which will be developed later.

FIG. 1 is a conceptual view illustrating a display device using a semiconductor light emitting device according to an embodiment of the present disclosure. According to the drawing, information processed in the controller of the display device 100 may be displayed using a flexible display.

The flexible display may include a flexible, bendable, twistable, foldable and rollable display. For example, the flexible display may be a display fabricated on a thin and flexible substrate that can be warped, bent, folded or rolled like a paper sheet while maintaining the display characteristics of a flat display in the related art.

A display area of the flexible display becomes a plane in a configuration that the flexible display is not warped (for example, a configuration having an infinite radius of curvature, hereinafter, referred to as a "first configuration"). The display area thereof becomes a curved surface in a configuration that the flexible display is warped by an external force in the first configuration (for example, a configuration having a finite radius of curvature, hereinafter, referred to as a "second configuration"). As illustrated in the drawing, information displayed in the second configuration may be visual information displayed on a curved surface. The visual information may be implemented by individually controlling the light emission of sub-pixels disposed in a matrix form. The sub-pixel denotes a minimum unit for implementing one color.

The sub-pixel of the flexible display may be implemented by a semiconductor light emitting device. According to the present disclosure, a light emitting diode (LED) is illustrated as a type of semiconductor light emitting device. The light emitting diode may be formed with a small size to perform the role of a sub-pixel even in the second configuration through this.

Hereinafter, a flexible display implemented using the light emitting diode will be described in more detail with reference to the accompanying drawings. In particular, FIG. 2 is a partial enlarged view of portion "A" in FIG. 1, and FIGS. 3A and 3B are cross-sectional views taken along lines B-B and C-C in FIG. 2, FIG. 4 is a conceptual view illustrating a flip-chip type semiconductor light emitting device in FIG. 3A, and FIGS. 5A through 5C are conceptual views illustrating various forms for implementing colors in connection with a flip-chip type semiconductor light emitting device.

Figure 2:
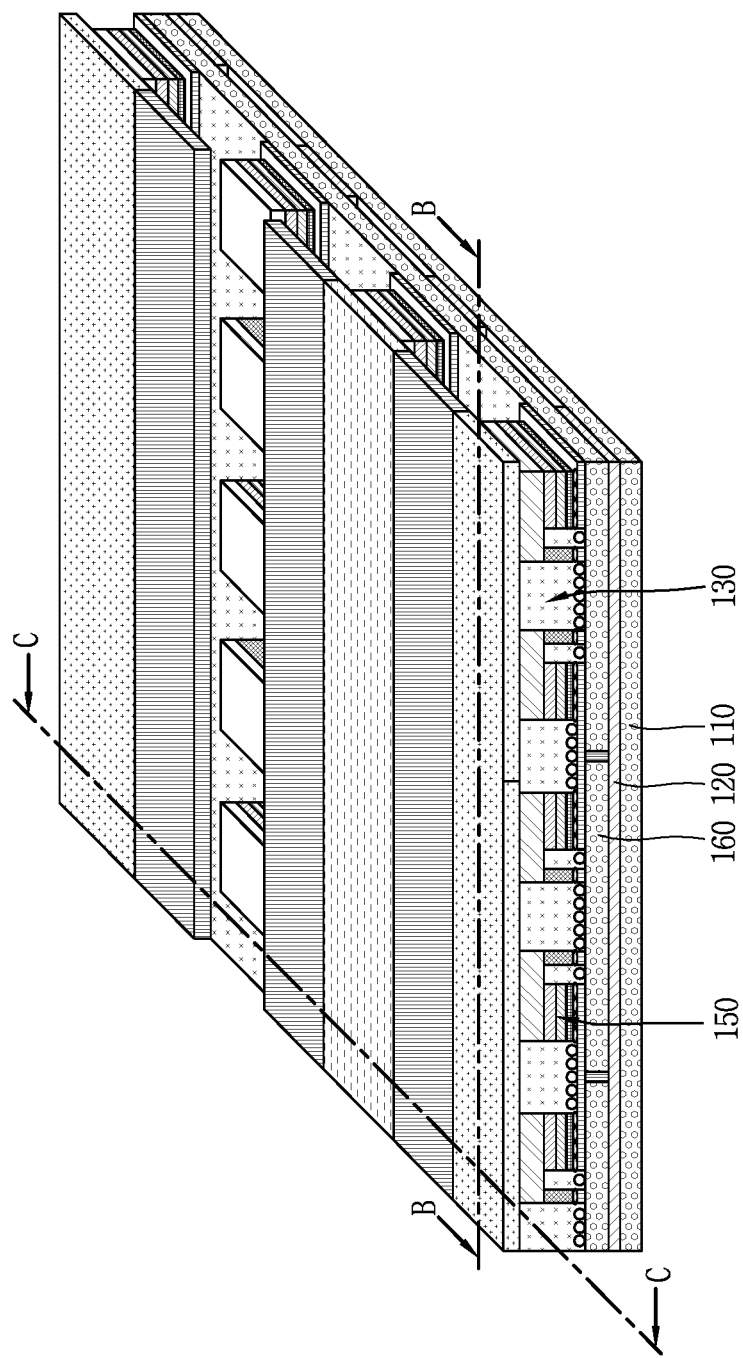
FIG. 2 is a partial enlarged view of portion "A" in FIG. 1, and FIGS. 3A and 3B are cross-sectional views taken along lines B-B and C-C in FIG. 2.
Figure 3A:
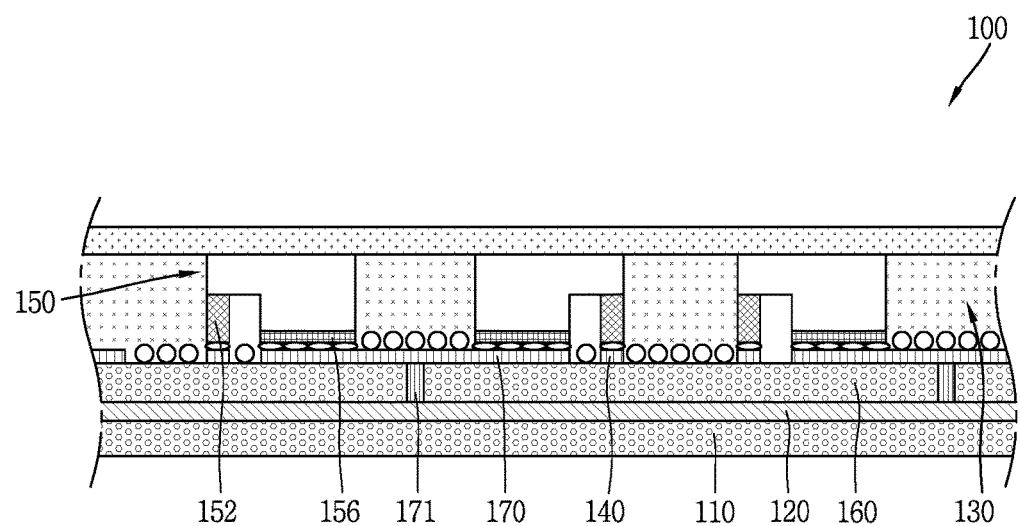
Figure 3B:
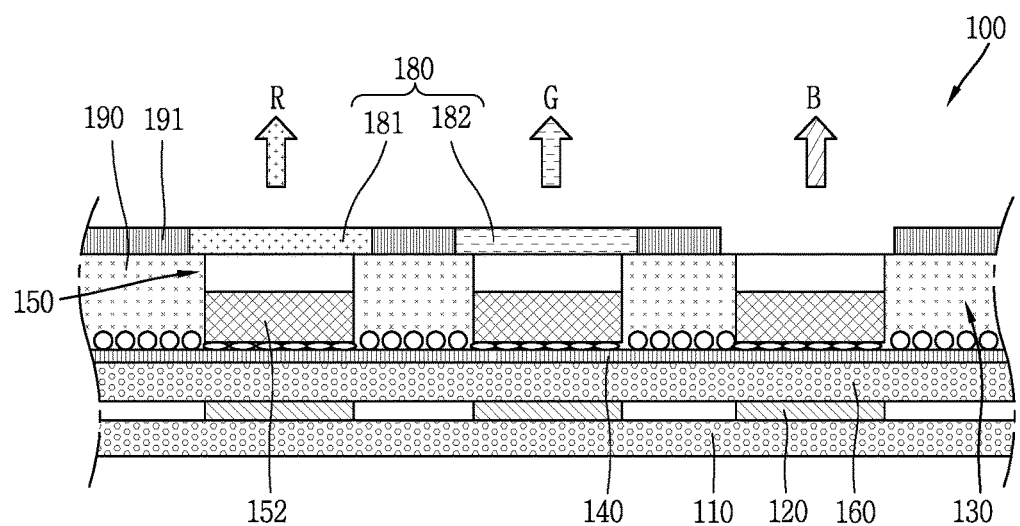
Figure 4:
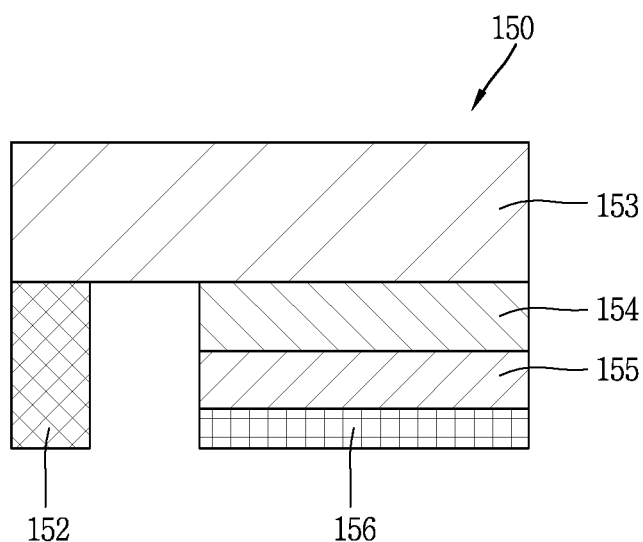
FIG. 4 is a conceptual view illustrating a flip-chip type semiconductor light emitting device in FIG. 3A.

According to the drawings in FIGS. 2, 3A and 3B, there is illustrated a display device 100 using a passive matrix (PM) type semiconductor light emitting device as a display device 100 using a semiconductor light emitting device. However, the following illustration may be also applicable to an active matrix (AM) type semiconductor light emitting device.

The display device 100 may include a substrate 110, a first electrode 120, a conductive adhesive layer 130, a second electrode 140, and a plurality of semiconductor light emitting devices 150. The substrate 110 may be a flexible substrate. The substrate 110 may contain glass or polyimide (PI) to implement the flexible display device. In addition, if it is a flexible material, any one such as polyethylene naphthalate (PEN), polyethylene terephthalate (PET) or the like may be used. Furthermore, the substrate 110 may be either one of transparent and non-transparent materials.

The substrate 110 may be a wiring substrate disposed with the first electrode 120, and thus the first electrode 120 may be placed on the substrate 110. According to the drawing, an insulating layer 160 may be disposed on the substrate 110 placed with the first electrode 120, and an auxiliary electrode 170 may be placed on the insulating layer 160. In this instance, a configuration in which the insulating layer 160 is deposited on the substrate 110 may be single wiring substrate. More specifically, the insulating layer 160 may be incorporated into the substrate 110 with an insulating and flexible material such as polyimide (PI), PET, PEN or the like to form single wiring substrate.

The auxiliary electrode 170 as an electrode for electrically connecting the first electrode 120 to the semiconductor light emitting device 150 is placed on the insulating layer 160, and disposed to correspond to the location of the first electrode 120. For example, the auxiliary electrode 170 has a dot shape, and may be electrically connected to the first electrode 120 by means of an electrode hole 171 passing through the insulating layer 160. The electrode hole 171 may be formed by filling a conductive material in a via hole.

Referring to the drawings, the conductive adhesive layer 130 may be formed on one surface of the insulating layer 160, but the present disclosure may not be necessarily limited to this. For example, it may be possible to also have a structure in which the conductive adhesive layer 130 is disposed on the substrate 110 with no insulating layer 160. The conductive adhesive layer 130 may perform the role of an insulating layer in the structure in which the conductive adhesive layer 130 is disposed on the substrate 110.

The conductive adhesive layer 130 may be a layer having adhesiveness and conductivity, and thus, a conductive material and an adhesive material may be mixed on the conductive adhesive layer 130. Furthermore, the conductive adhesive layer 130 may have flexibility, thereby allowing a flexible function in the display device.

For example, the conductive adhesive layer 130 may be an anisotropic conductive film (ACF), an anisotropic conductive paste, a solution containing conductive particles, and the like. The conductive adhesive layer 130 may allow electrical interconnection in the z-direction passing through the thickness thereof, but may be configured as a layer having electrical insulation in the horizontal x-y direction thereof. Accordingly, the conductive adhesive layer 130 may be referred to as a z-axis conductive layer (however, hereinafter referred to as a "conductive adhesive layer").

The anisotropic conductive film is a film with a form in which an anisotropic conductive medium is mixed with an insulating base member, and thus when heat and pressure are applied thereto, only a specific portion thereof may have conductivity by means of the anisotropic conductive medium. Hereinafter, heat and pressure are applied to the anisotropic conductive film, but other methods may be also available for the anisotropic conductive film to partially have conductivity. The methods may include applying only either one of heat and pressure thereto, UV curing, and the like.

Furthermore, the anisotropic conductive medium may be conductive balls or particles. According to the drawing, in the present embodiment, the anisotropic conductive film is a film with a form in which an anisotropic conductive medium is mixed with an insulating base member, and thus when heat and pressure are applied thereto, only a specific portion thereof may have conductivity by means of the conductive balls. The anisotropic conductive film may be in a state in which a core with a conductive material contains a plurality of particles coated by an insulating layer with a polymer material, and in this instance, it may have conductivity by means of the core while breaking an insulating layer on a portion to which heat and pressure are applied. Here, a core may be transformed to implement a layer having both surfaces to which objects contact in the thickness direction of the film.

For a more specific example, heat and pressure are applied to an anisotropic conductive film as a whole, and electrical connection in the z-axis direction is partially formed by a height difference from a mating object adhered by the use of the anisotropic conductive film. In another example, an anisotropic conductive film may be in a state containing a plurality of particles in which a conductive material is coated on insulating cores. In this instance, a portion to which heat and pressure are applied may be converted (pressed and adhered) to a conductive material to have conductivity in the thickness direction of the film. For still another example, it may be formed to have conductivity in the thickness direction of the film in which a conductive material passes through an insulating base member in the z-direction. In this instance, the conductive material may have a pointed end portion.

According to the drawing, the anisotropic conductive film may be a fixed array anisotropic conductive film (ACF) configured with a form in which conductive balls are inserted into one surface of the insulating base member. More specifically, the insulating base member is formed of an adhesive material, and the conductive balls are intensively disposed at a bottom portion of the insulating base member, and when heat and pressure are applied thereto, the base member is modified along with the conductive balls, thereby having conductivity in the vertical direction thereof.

However, the present disclosure may not be necessarily limited to this, and the anisotropic conductive film may be all allowed to have a form in which conductive balls are randomly mixed with an insulating base member or a form configured with a plurality of layers in which conductive balls are disposed at any one layer (double-ACF), and the like.

The anisotropic conductive paste as a form coupled to a paste and conductive balls may be a paste in which conductive balls are mixed with an insulating and adhesive base material. Furthermore, a solution containing conductive particles may be a solution in a form containing conductive particles or nano particles.

Referring to the drawing again, the second electrode 140 is located at the insulating layer 160 to be separated from the auxiliary electrode 170. In other words, the conductive adhesive layer 130 is disposed on the insulating layer 160 located with the auxiliary electrode 170 and second electrode 140.

When the conductive adhesive layer 130 is formed in a state that the auxiliary electrode 170 and second electrode 140 are located, and then the semiconductor light emitting device 150 is connect thereto in a flip chip form with the application of heat and pressure, the semiconductor light emitting device 150 is electrically connected to the first electrode 120 and second electrode 140.

Referring to FIG. 4, the semiconductor light emitting device may be a flip chip type semiconductor light emitting device. For example, the semiconductor light emitting device may include a p-type electrode 156, a p-type semiconductor layer 155 formed with the p-type electrode 156, an active layer 154 formed on the p-type semiconductor layer 155, an n-type semiconductor layer 153 formed on the active layer 154, and an n-type electrode 152 disposed to be separated from the p-type electrode 156 in the horizontal direction on the n-type semiconductor layer 153. In this instance, the p-type electrode 156 may be electrically connected to the welding portion 179 by the conductive adhesive layer 130, and the n-type electrode 152 may be electrically connected to the second electrode 140.

Referring to FIGS. 2, 3A and 3B again, the auxiliary electrode 170 may be formed in an elongated manner in one direction to be electrically connected to a plurality of semiconductor light emitting devices 150. For example, the left and right p-type electrodes of the semiconductor light emitting devices around the auxiliary electrode may be electrically connected to one auxiliary electrode.

More specifically, the semiconductor light emitting device 150 is pressed into the conductive adhesive layer 130, and through this, only a portion between the p-type electrode 156 and auxiliary electrode 170 of the semiconductor light emitting device 150 and a portion between the n-type electrode 152 and second electrode 140 of the semiconductor light emitting device 150 have conductivity, and the remaining portion does not have conductivity since there is no push-down of the semiconductor light emitting device.

Furthermore, a plurality of semiconductor light emitting devices 150 constitute a light-emitting array, and a phosphor layer 180 is formed on the light-emitting array. The light emitting device may include a plurality of semiconductor light emitting devices with different self luminance values. Each of the semiconductor light emitting devices 150 constitutes a sub-pixel, and is electrically connected to the first electrode 120. For example, there may exist a plurality of first electrodes 120, and the semiconductor light emitting devices are arranged in several rows, for instance, and each row of the semiconductor light emitting devices may be electrically connected to any one of the plurality of first electrodes.

Furthermore, the semiconductor light emitting devices may be connected in a flip chip form, and thus semiconductor light emitting devices grown on a transparent dielectric substrate. Furthermore, the semiconductor light emitting devices may be nitride semiconductor light emitting devices, for instance. The semiconductor light emitting device 150 has an excellent luminance characteristic, and thus it may be possible to configure individual sub-pixels even with a small size thereof.

According to the drawing, a partition wall 190 may be formed between the semiconductor light emitting devices 150. In this instance, the partition wall 190 may perform the role of dividing individual sub-pixels from one another, and be formed as an integral body with the conductive adhesive layer 130. For example, a base member of the anisotropic conductive film may form the partition wall when the semiconductor light emitting device 150 is inserted into the anisotropic conductive film.

Furthermore, when the base member of the anisotropic conductive film is black, the partition wall 190 may have reflective characteristics while at the same time increasing contrast with no additional black insulator. In another example, a reflective partition wall may be separately provided with the partition wall 190. In this instance, the partition wall 190 may include a black or white insulator according to the purpose of the display device. It may have an effect of enhancing reflectivity when the partition wall of the while insulator is used, and increase contrast while at the same time having reflective characteristics.

The phosphor layer 180 may be located at an outer surface of the semiconductor light emitting device 150. For example, the semiconductor light emitting device 150 is a blue semiconductor light emitting device that emits blue (B) light, and the phosphor layer 180 performs the role of converting the blue (B) light into the color of a sub-pixel. The phosphor layer 180 may be a red phosphor layer 181 or green phosphor layer 182 constituting individual pixels.

In other words, a red phosphor 181 capable of converting blue light into red (R) light may be deposited on the blue semiconductor light emitting device 151 at a location implementing a red sub-pixel, and a green phosphor 182 capable of converting blue light into green (G) light may be deposited on the blue semiconductor light emitting device 151 at a location implementing a green sub-pixel. Furthermore, only the blue semiconductor light emitting device 151 may be solely used at a location implementing a blue sub-pixel. In this instance, the red (R), green (G) and blue (B) sub-pixels may implement one pixel. More specifically, one color phosphor may be deposited along each line of the first electrode 120. Accordingly, one line on the first electrode 120 may be an electrode controlling one color. In other words, red (R), green (B) and blue (B) may be sequentially disposed, thereby implementing sub-pixels.

However, the present disclosure may not be necessarily limited to this, and the semiconductor light emitting device 150 may be combined with a quantum dot (QD) instead of a phosphor to implement sub-pixels such as red (R), green (G) and blue (B). Furthermore, a black matrix 191 may be disposed between each phosphor layer to enhance contrast. In other words, the black matrix 191 can enhance the contrast of luminance. However, the present disclosure may not be necessarily limited to this, and another structure for implementing blue, red and green may be also applicable thereto.

Figure 5A:
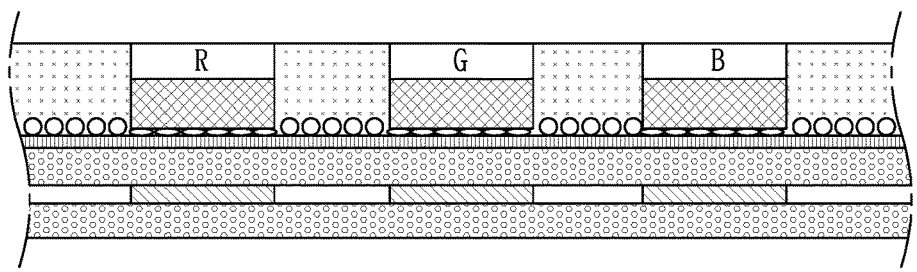
FIGS. 5A through 5C are conceptual views illustrating various forms for implementing colors in connection with a flip-chip type semiconductor light emitting device.

Referring to FIG. 5A, each of the semiconductor light emitting devices 150 may be implemented with a high-power light emitting device that emits various lights including blue in which gallium nitride (GaN) is mostly used, and indium (In) and or aluminum (Al) are added thereto.

In this instance, the semiconductor light emitting device 150 may be red, green and blue semiconductor light emitting devices, respectively, to implement each sub-pixel. For instance, red, green and blue semiconductor light emitting devices (R, G, B) are alternately disposed, and red, green and blue sub-pixels implement one pixel by means of the red, green and blue semiconductor light emitting devices, thereby implementing a full color display.

Figure 5B:
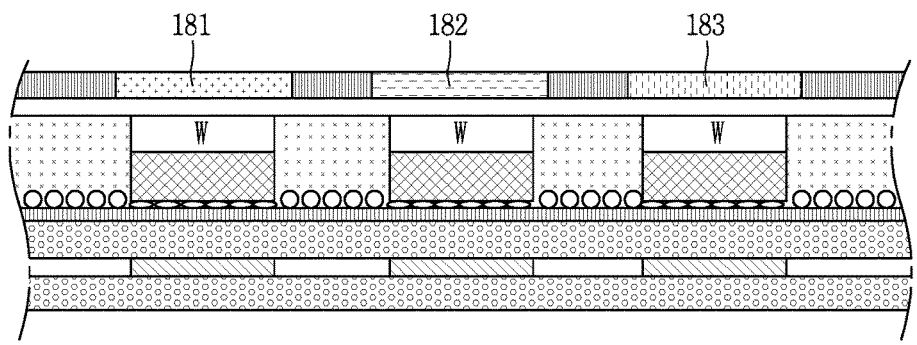

Referring to FIG. 5B, the semiconductor light emitting device may have a white light emitting device (W) provided with a yellow phosphor layer for each element. In this instance, a red phosphor layer 181, a green phosphor layer 182 and blue phosphor layer 183 may be provided on the white light emitting device (W) to implement a sub-pixel. Furthermore, a color filter repeated with red, green and blue on the white light emitting device (W) may be used to implement a sub-pixel.

Figure 5C:
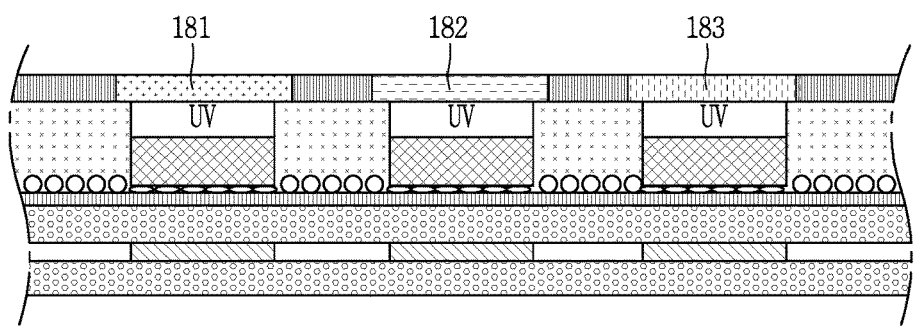

Referring to FIG. 5C, it may be possible to also have a structure in which a red phosphor layer 181, a green phosphor layer 182 and blue phosphor layer 183 may be provided on a ultra violet light emitting device (UV). Thus, the semiconductor light emitting device can be used over the entire region up to ultra violet (UV) as well as visible light, and may be extended to a form of semiconductor light emitting device in which ultra violet (UV) can be used as an excitation source.

Taking the present example into consideration again, the semiconductor light emitting device 150 is placed on the conductive adhesive layer 130 to configure a sub-pixel in the display device. The semiconductor light emitting device 150 may have excellent luminance characteristics, and thus it may be possible to configure individual sub-pixels even with a small size thereof. The size of the individual semiconductor light emitting device 150 may be less than 80 μm in the length of one side thereof, and formed with a rectangular or square shaped element. In case of a rectangular shaped element, the size thereof may be less than 20×80 μm.

Furthermore, even when a square shaped semiconductor light emitting device 150 with a length of side of 10 μm is used for a sub-pixel, it will exhibit a sufficient brightness for implementing a display device. Accordingly, for example, in case of a rectangular pixel in which one side of a sub-pixel is 600 μm in size, and the remaining one side thereof is 300 μm, a relative distance between the semiconductor light emitting devices becomes sufficiently large. Accordingly, in this instance, it may be possible to implement a flexible display device having a HD image quality.

Figure 6:
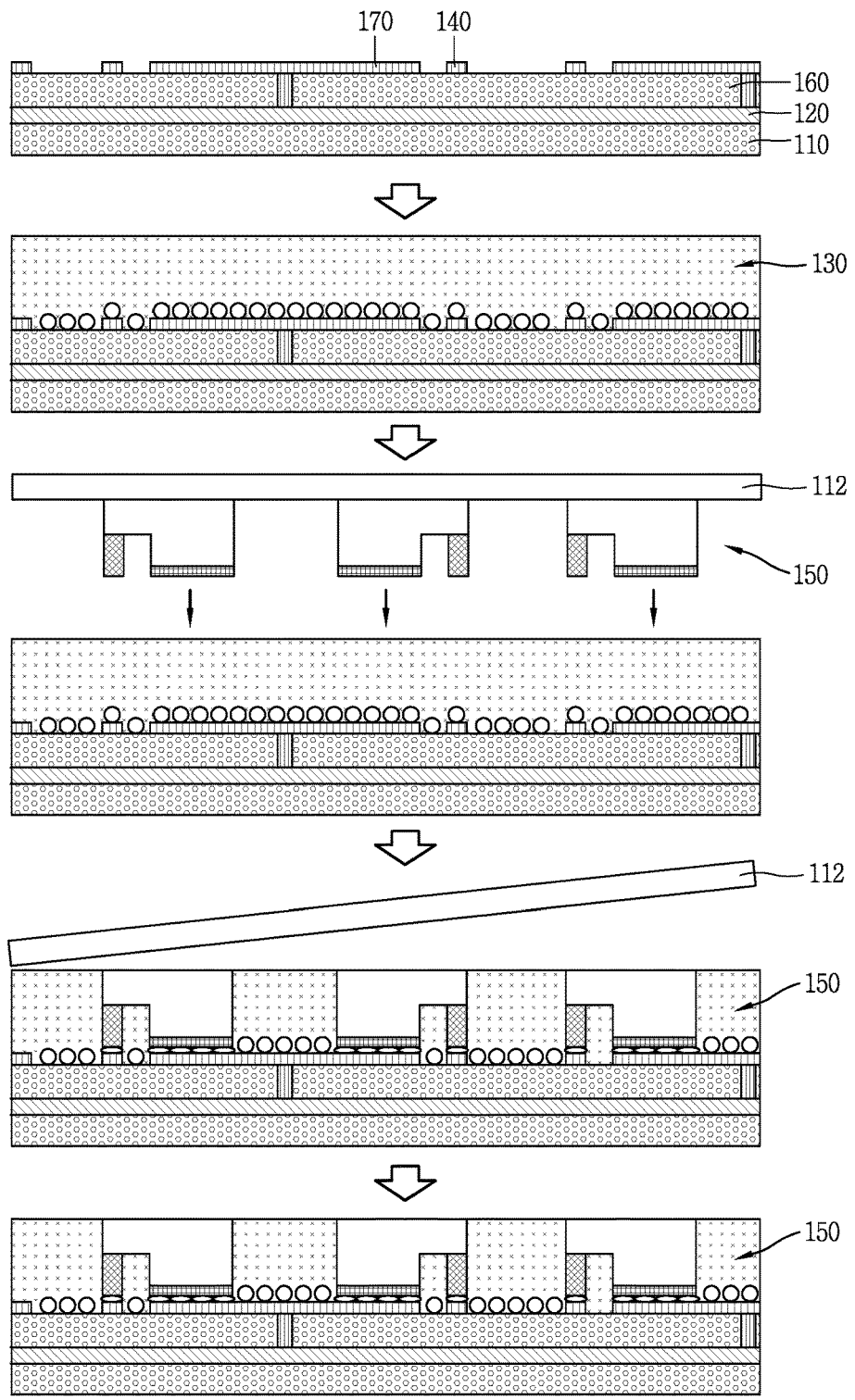
FIG. 6 is cross-sectional views illustrating a fabrication method of a display device using a semiconductor light emitting device according to the present disclosure.

A display device using the foregoing semiconductor light emitting device will be fabricated by a new type of fabrication method. Hereinafter, the fabrication method will be described with reference to FIG. 6. In particular, FIG. 6 is cross-sectional views illustrating a method of fabricating a display device using a semiconductor light emitting device according to the present disclosure.

Referring to the drawing, first, the conductive adhesive layer 130 is formed on the insulating layer 160 located with the auxiliary electrode 170 and second electrode 140. The insulating layer 160 is deposited on the first substrate 110 to form one substrate (or wiring substrate), and the first electrode 120, auxiliary electrode 170 and second electrode 140 are disposed at the wiring substrate. In this instance, the first electrode 120 and second electrode 140 may be disposed in a perpendicular direction to each other. Furthermore, the first substrate 110 and insulating layer 160 may contain glass or polyimide (PI), respectively, to implement a flexible display device.

The conductive adhesive layer 130 may be implemented by an anisotropic conductive film, for example, and thus, an anisotropic conductive film may be coated on a substrate located with the insulating layer 160. Next, a second substrate 112 located with a plurality of semiconductor light emitting devices 150 corresponding to the location of the auxiliary electrodes 170 and second electrodes 140 and constituting individual pixels is disposed such that the semiconductor light emitting device 150 faces the auxiliary electrode 170 and second electrode 140.

In this instance, the second substrate 112 as a growth substrate for growing the semiconductor light emitting device 150 may be a sapphire substrate or silicon substrate. The semiconductor light emitting device may have a gap and size capable of implementing a display device when formed in the unit of wafer, and thus effectively used for a display device.

Next, the wiring substrate is thermally compressed to the second substrate 112. For example, the wiring substrate and second substrate 112 may be thermally compressed to each other by applying an ACF press head. The wiring substrate and second substrate 112 are bonded to each other using the thermal compression. Only a portion between the semiconductor light emitting device 150 and the auxiliary electrode 170 and second electrode 140 may have conductivity due to the characteristics of an anisotropic conductive film having conductivity by thermal compression, thereby allowing the electrodes and semiconductor light emitting device 150 to be electrically connected to each other. In addition, the semiconductor light emitting device 150 may be inserted into the anisotropic conductive film, thereby forming a partition wall between the semiconductor light emitting devices 150.

Next, the second substrate 112 is removed. For example, the second substrate 112 may be removed using a laser lift-off (LLO) or chemical lift-off (CLO) method. Finally, the second substrate 112 is removed to expose the semiconductor light emitting devices 150 to the outside. Silicon oxide (SiOx) or the like may be coated on the wiring substrate coupled to the semiconductor light emitting device 150 to form a transparent insulating layer.

The process of forming a phosphor layer on one surface of the semiconductor light emitting device 150 can also be included. For example, the semiconductor light emitting device 150 may be a blue semiconductor light emitting device for emitting blue (B) light, and red or green phosphor for converting the blue (B) light into the color of the sub-pixel may form a layer on one surface of the blue semiconductor light emitting device.

The fabrication method or structure of a display device using the foregoing semiconductor light emitting device may be modified in various forms. For example, the foregoing display device may be applicable to a vertical semiconductor light emitting device. Hereinafter, the vertical structure will be described with reference to FIGS. 5 and 6. Furthermore, according to the following modified example or embodiment, the same or similar reference numerals are designated to the same or similar configurations to the foregoing example, and the description thereof will be substituted by the earlier description.

Figure 7:
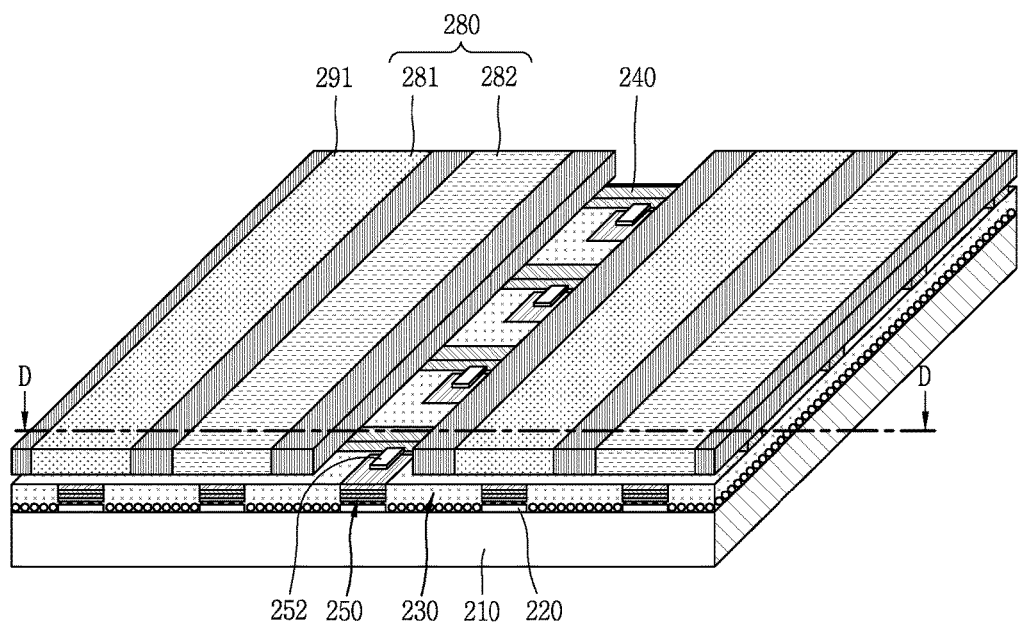
FIG. 7 is a perspective view illustrating a display device using a semiconductor light emitting device according to another embodiment of the present disclosure.
Figure 8:
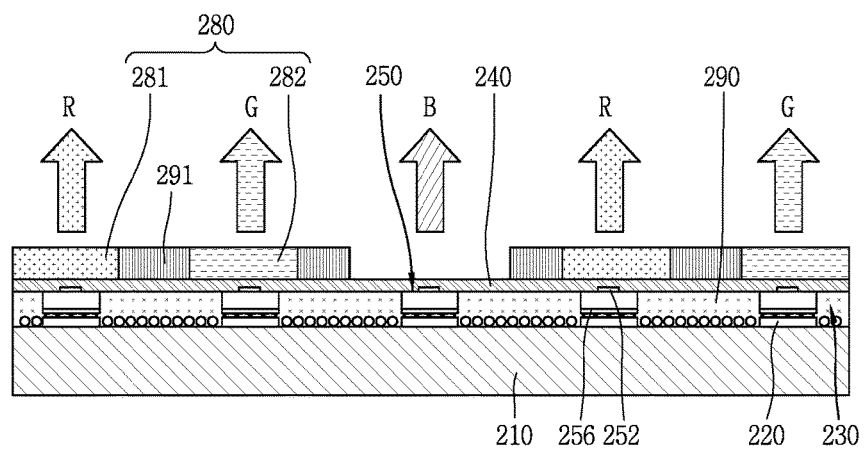
FIG. 8 is a cross-sectional view taken along line C-C in FIG. 7.
Figure 9:
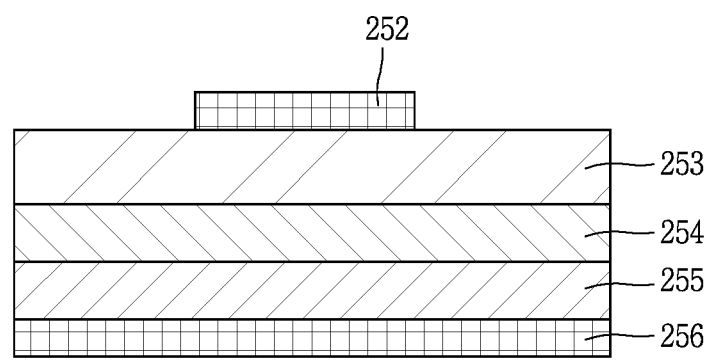
FIG. 9 is a conceptual view illustrating a vertical type semiconductor light emitting device in FIG. 8.

Next, FIG. 7 is a perspective view illustrating a display device using a semiconductor light emitting device according to another embodiment of the present disclosure. FIG. 8 is a cross-sectional view taken along line C-C in FIG. 7, and FIG. 9 is a conceptual view illustrating a vertical type semiconductor light emitting device in FIG. 8.

According to the drawings, the display device may be display device using a passive matrix (PM) type of vertical semiconductor light emitting device. The display device may include a substrate 210, a first electrode 220, a conductive adhesive layer 230, a second electrode 240 and a plurality of semiconductor light emitting devices 250.

The substrate 210 as a wiring substrate disposed with the first electrode 220 may include polyimide (PI) to implement a flexible display device. In addition, any one may be used if it is an insulating and flexible material. The first electrode 220 may be located on the substrate 210, and formed with a bar-shaped electrode elongated in one direction. The first electrode 220 may be formed to perform the role of a data electrode.

The conductive adhesive layer 230 is formed on the substrate 210 located with the first electrode 220. Similarly to a display device to which a flip chip type light emitting device is applied, the conductive adhesive layer 230 may be an anisotropic conductive film (ACF), an anisotropic conductive paste, a solution containing conductive particles, and the like. However, the present embodiment illustrates a case where the conductive adhesive layer 230 is implemented by an anisotropic conductive film.

When an anisotropic conductive film is located when the first electrode 220 is located on the substrate 210, and then heat and pressure are applied to connect the semiconductor light emitting device 250 thereto, the semiconductor light emitting device 250 is electrically connected to the first electrode 220. In addition, the semiconductor light emitting device 250 may be preferably disposed on the first electrode 220.

The electrical connection is generated because an anisotropic conductive film partially has conductivity in the thickness direction when heat and pressure are applied as described above. Accordingly, the anisotropic conductive film is partitioned into a portion 231 having conductivity and a portion 232 having no conductivity in the thickness direction thereof.

Furthermore, the anisotropic conductive film contains an adhesive component, and thus the conductive adhesive layer 230 implements a mechanical coupling as well as an electrical coupling between the semiconductor light emitting device 250 and the first electrode 220.

Thus, the semiconductor light emitting device 250 is placed on the conductive adhesive layer 230, thereby configuring a separate sub-pixel in the display device. The semiconductor light emitting device 250 may have excellent luminance characteristics, and thus it may be possible to configure individual sub-pixels even with a small size thereof. The size of the individual semiconductor light emitting device 250 may be less than 80 µm in the length of one side thereof, and formed with a rectangular or square shaped element. In case of a rectangular shaped element, the size thereof may be less than 20×80 µm.

The semiconductor light emitting device 250 may be a vertical structure. A plurality of second electrodes 240 disposed in a direction of crossing the length direction of the first electrode 220, and electrically connected to the vertical semiconductor light emitting device 250 may be located between vertical semiconductor light emitting devices.

Referring to FIG. 9, the vertical semiconductor light emitting device may include a p-type electrode 256, a p-type semiconductor layer 255 formed with the p-type electrode 256, an active layer 254 formed on the p-type semiconductor layer 255, an n-type semiconductor layer 253 formed on the active layer 254, and an n-type electrode 252 formed on the n-type semiconductor layer 253. In this instance, the p-type electrode 256 located at the bottom thereof may be electrically connected to the first electrode 220 by the conductive adhesive layer 230, and the n-type electrode 252 located at the top thereof may be electrically connected to the second electrode 240 which will be described later. The electrodes may be disposed in the upward/downward direction in the vertical semiconductor light emitting device 250, thereby providing a great advantage capable of reducing the chip size.

Referring to FIG. 8 again, a phosphor layer 280 may be formed on one surface of the semiconductor light emitting device 250. For example, the semiconductor light emitting device 250 is a blue semiconductor light emitting device 251 that emits blue (B) light, and the phosphor layer 280 for converting the blue (B) light into the color of the sub-pixel may be provided thereon. In this instance, the phosphor layer 280 may be a red phosphor 281 and a green phosphor 282 constituting individual pixels.

In other words, a red phosphor 281 capable of converting blue light into red (R) light may be deposited on the blue semiconductor light emitting device 251 at a location implementing a red sub-pixel, and a green phosphor 282 capable of converting blue light into green (G) light may be deposited on the blue semiconductor light emitting device 251 at a location implementing a green sub-pixel. Furthermore, only the blue semiconductor light emitting device 251 may be solely used at a location implementing a blue sub-pixel. In this instance, the red (R), green (G) and blue (B) sub-pixels may implement one pixel.

However, the present disclosure may not be necessarily limited to this, and another structure for implementing blue, red and green may be also applicable thereto as described above in a display device to which a flip chip type light emitting device is applied.

Taking the present embodiment into consideration again, the second electrode 240 is located between the semiconductor light emitting devices 250, and electrically connected to the semiconductor light emitting devices 250. For example, the semiconductor light emitting devices 250 may be disposed in a plurality of rows, and the second electrode 240 may be located between the rows of the semiconductor light emitting devices 250.

Since a distance between the semiconductor light emitting devices 250 constituting individual pixels is sufficiently large, the second electrode 240 may be located between the semiconductor light emitting devices 250. The second electrode 240 may be formed with a bar-shaped electrode elongated in one direction, and disposed in a perpendicular direction to the first electrode.

Furthermore, the second electrode 240 may be electrically connected to the semiconductor light emitting device 250 by a connecting electrode protruded from the second electrode 240. More specifically, the connecting electrode may be an n-type electrode of the semiconductor light emitting device 250. For example, the n-type electrode is formed with an ohmic electrode for ohmic contact, and the second electrode covers at least part of the ohmic electrode by printing or deposition. Through this, the second electrode 240 may be electrically connected to the n-type electrode of the semiconductor light emitting device 250.

According to the drawing, the second electrode 240 may be located on the conductive adhesive layer 230. According to circumstances, a transparent insulating layer containing silicon oxide (SiOx) may be formed on the substrate 210 formed with the semiconductor light emitting device 250. When the transparent insulating layer is formed and then the second electrode 240 is placed thereon, the second electrode 240 may be located on the transparent insulating layer. Furthermore, the second electrode 240 may be formed to be separated from the conductive adhesive layer 230 or transparent insulating layer.

If a transparent electrode such as indium tin oxide (ITO) is used to locate the second electrode 240 on the semiconductor light emitting device 250, the ITO material has a problem of bad adhesiveness with an n-type semiconductor. Accordingly, the second electrode 240 may be placed between the semiconductor light emitting devices 250, thereby obtaining an advantage in which the transparent electrode is not required. Accordingly, an n-type semiconductor layer and a conductive material having a good adhesiveness may be used as a horizontal electrode without being restricted by the selection of a transparent material, thereby enhancing the light extraction efficiency.

According to the drawing, a partition wall 290 may be formed between the semiconductor light emitting devices 250. In other words, the partition wall 290 may be disposed between the vertical semiconductor light emitting devices 250 to isolate the semiconductor light emitting device 250 constituting individual pixels. In this instance, the partition wall 290 may perform the role of dividing individual sub-pixels from one another, and be formed as an integral body with the conductive adhesive layer 230. For example, a base member of the anisotropic conductive film may form the partition wall when the semiconductor light emitting device 250 is inserted into the anisotropic conductive film.

Furthermore, when the base member of the anisotropic conductive film is black, the partition wall 290 may have reflective characteristics while at the same time increasing contrast with no additional black insulator. In another example, a reflective partition wall may be separately provided with the partition wall 290. In this instance, the partition wall 290 may include a black or white insulator according to the purpose of the display device.

If the second electrode 240 is precisely located on the conductive adhesive layer 230 between the semiconductor light emitting devices 250, the partition wall 290 may be located between the semiconductor light emitting device 250 and second electrode 240. Accordingly, individual sub-pixels may be configured even with a small size using the semiconductor light emitting device 250, and a distance between the semiconductor light emitting devices 250 may be relatively sufficiently large to place the second electrode 240 between the semiconductor light emitting devices 250, thereby having the effect of implementing a flexible display device having a HD image quality.

Furthermore, according to the drawing, a black matrix 291 may be disposed between each phosphor layer to enhance contrast. In other words, the black matrix 191 can enhance the contrast of luminance. As described above, the semiconductor light emitting device 250 is located on the conductive adhesive layer 230, thereby constituting individual pixels on the display device. Since the semiconductor light emitting device 250 has excellent luminance characteristics, thereby configuring individual sub-pixels even with a small size thereof. As a result, it may be possible to implement a full color display in which the sub-pixels of red (R), green (G) and blue (B) implement one pixel by means of the semiconductor light emitting device.

Further, the foregoing display device may further include a touch sensor for sensing a touch operation applied to the display device. A display device provided with a touch sensor may include the configuration of a display unit (or display module or display) and a touch sensor unit (or touch sensor), and be also used as an input device other than an output device.

The touch sensor may sense a touch to the display device using at least one of various types of touch modes, such as a resistive type, a capacitive type, an infrared type, an ultrasonic type, a magnetic field type, and the like. Hereinafter, the structure of a display device provided with a touch sensor for sensing a touch in a capacitive mode will be described in more detail. However, the structure of a touch sensor according to the present disclosure may not be necessarily limited to the capacitive mode. For example, a magnetic field mode in which the touch sensor is provided with one magnetic field coil may be also applicable thereto.

Figure 10:
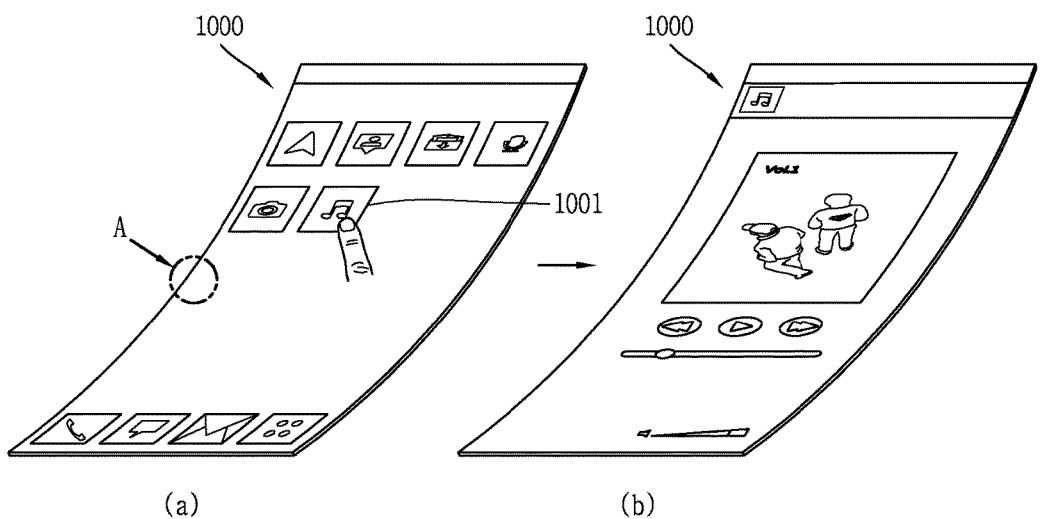
FIGS. 10 and 11 are conceptual views illustrating an example of a display device further provided with a touch sensor.
Figure 11:
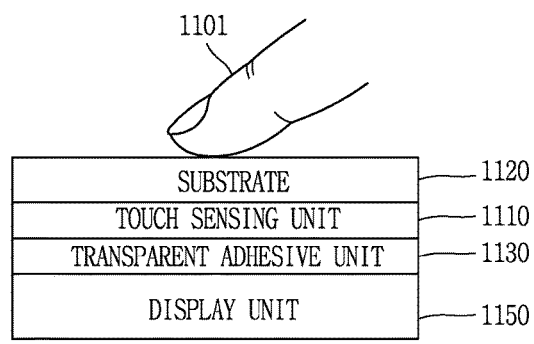

A touch sensor for sensing a touch in a capacitive mode may be configured to convert a pressure applied to a specific portion or a change of capacitance or the like generated at a specific portion of the display module to an electrical input signal. When there is a touch input to the touch sensor, a signal (or signals) corresponding thereto may be processed by the controller of the display device, and the processed signals may be converted to the corresponding data. Hereinafter, a display device provided with such a capacitance mode will be described in more detail with reference to the accompanying drawings. FIGS. 10 and 11 are conceptual views illustrating an example of a display device further provided with a touch sensor.

First, according to the drawing of FIG. 10, information processed on the controller of the display device 1000 may be displayed using a flexible display. The description of the flexible display will be substituted by the description of FIG. 1. As illustrated in the drawing, a touch sensor may be provided in the display device 1000 including a flexible display. For example, as illustrated in FIG. 10A, when a touch input is applied to the display device 1000, the controller processes the touch input to perform a control corresponding to the processed touch input. For example, when a touch input is applied to any icon 1001 in FIG. 10A, the controller processes the touch input to display the corresponding screen information on the display device 1000 as illustrated in FIG. 10B. In this instance, a touch input may be applied when the flexible display is bent, and the touch screen is configured to sense the touch input applied in this state.

Further, a unit pixel of the display device 1000 configured with a flexible display may be implemented by a semiconductor light emitting device. According to the present disclosure, a light emitting diode (LED) is illustrated as a kind of the semiconductor light emitting device for converting a current into light. The light emitting diode is formed with a small size, thereby performing the role of a unit pixel even in the second configuration.

When the structure of a display device capable of allowing a front and a rear touch is schematically illustrated with reference to FIG. 11, the display device 1000 according to the present disclosure may include a substrate 1120, a touch sensing unit 1110, a transparent adhesive unit 1130, and a display unit 1150.

A plurality of semiconductor light emitting devices for implementing unit pixels may be disposed on the display unit 1150 as described above with reference to FIG. 2. The touch sensing unit 1110 is configured to overlap with the display unit 1150. The touch sensing unit 1110 and display unit 1150 may be overlap with each other by interposing the transparent adhesive unit 1130 therebetween. The touch sensing unit 1110 is disposed at either one of one side and the other side thereof with respect to the plurality of semiconductor light emitting devices, and configured to sense a touch to the display unit 1150. In other words, the touch sensing unit 1110 may be disposed on either one of one surface and the other surface of the display unit 1150. Furthermore, a tempered glass or polyimide substrate 1120 may be deposited on the touch sensing unit 1110.

According to the present disclosure, the display unit 1150 is configured with semiconductor light emitting devices to implement a thin film display having a very low thickness. As a result, the touch sensing unit 1110 according to the present disclosure may be configured with a thin structure and materials in consideration of the thickness of a display. For example, the touch sensing unit 1110 may have a capacitive touch mode, and configured with a touch electrode formed on a tempered glass or polyimide substrate.

Further, in order to implement a touch screen with the lowest thickness suitable to a flexible display, the touch electrode may be single layer. Meanwhile, the touch sensing unit 1110 may be adhered to the display unit 1150 through the transparent adhesive unit 1130, thereby implementing a flexible touch screen according to the present disclosure.

Figure 12A:
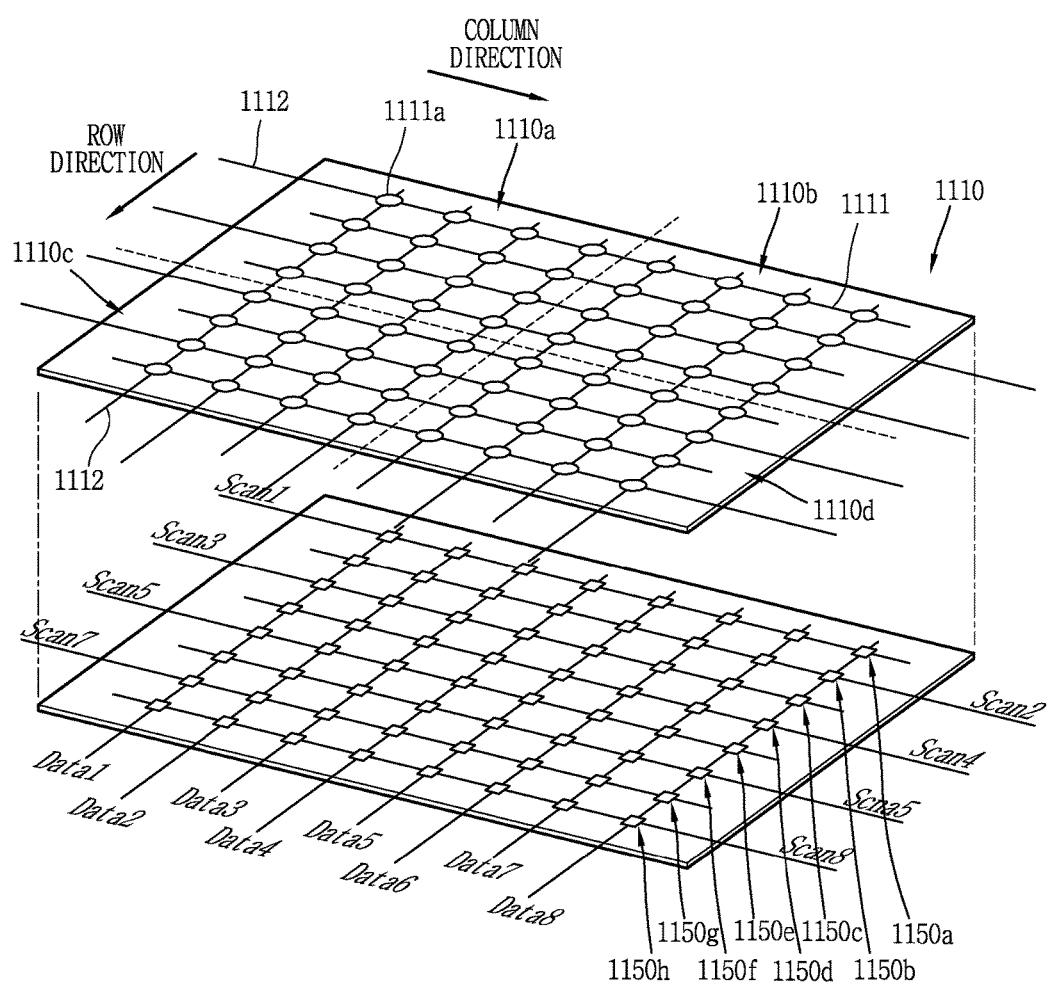
FIGS. 12A and 12B are conceptual views illustrating a plurality of touch sensor regions in a display device according to the present disclosure.
Figure 12B:
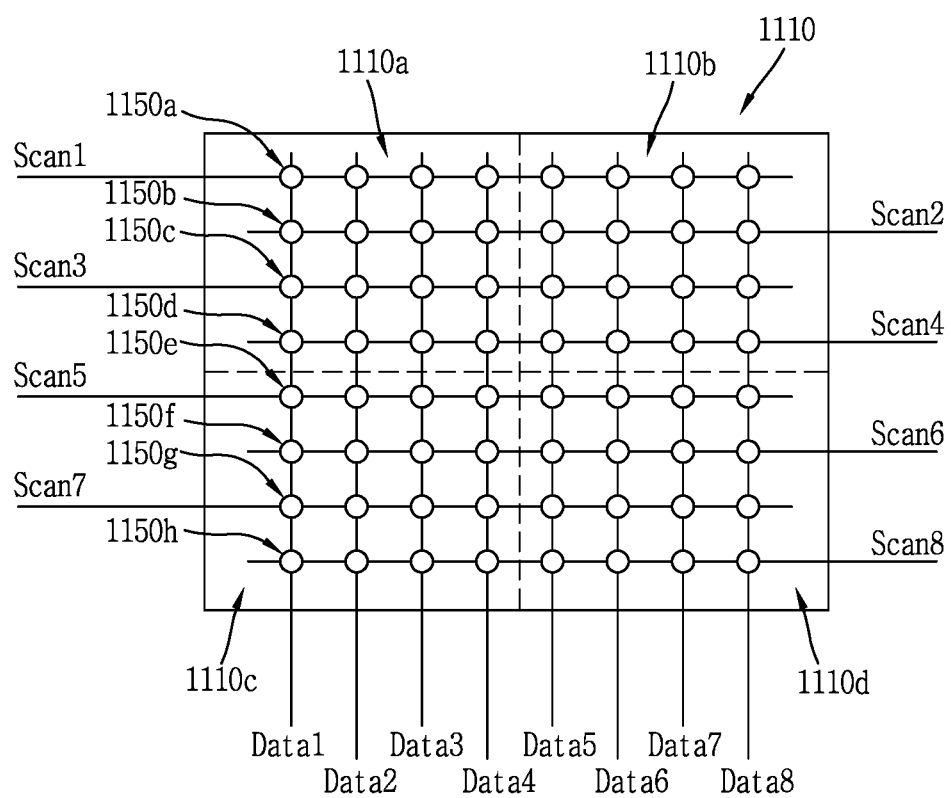

Hereinafter, a flexible display implemented using the light emitting diode and configured with a touch sensor will be described in more detail with reference to the accompanying drawings. FIGS. 12A and 12B are conceptual views illustrating a plurality of touch sensor regions in a display device according to the present disclosure.

Further, for the description of FIGS. 12A and 12B, it will be described with reference to the foregoing structure of the display device 1000. In a display device according to the present disclosure, a semiconductor light emitting device is electrically connected to a first electrode 120, 220 and a second electrode 140, 240 (refer to FIGS. 2, 3A, 7 and 8). In this instance, the first electrode 120, 220 may be a data line for transmitting a data driving signal, and the second electrode 140, 240 may be a scan line for transmitting a scan driving signal.

As described above, one line on data lines may be an electrode for controlling a single color. In other words, a semiconductor light emitting device or phosphor may be disposed to sequentially emit (R), green (G) and blue (B) along one scan line, thereby implementing a unit pixel. Meanwhile, according to a display device according to the present disclosure, a plurality of scan lines and a plurality of data lines are provided therein, and a plurality of semiconductor light emitting devices are disposed along each scan line.

Moreover, as illustrated in the drawing, the touch sensing unit 1110 according to the present disclosure may include a plurality of touch sensing lines. The plurality of touch sensing lines may be configured to cross each other along a row direction in parallel to the scan line, and a column direction in parallel to the data line.

Here, a touch sensing line arranged in a row direction may be referred to as an X-touch electrode (or X electrode), and a touch sensing line arranged in a column direction may be referred to as a Y-touch electrode (or Y electrode). Further, the sensing of a touch is performed at a position 1111a on which a touch sensing line in a row direction (or X-touch electrode 1111) and a touch sensing line in a column direction (or Y-touch electrode 1112) are crossed with each other.

Further, a display device according to the present disclosure may drive a display device in a frame unit. In other words, the controller may drive the display unit 1150 and touch sensing unit 1110 in a frame unit. More specifically, the controller may sequentially supply a current to scan lines provided in the display device for each frame. Accordingly, semiconductor light emitting devices disposed to correspond to scan lines, respectively, may be sequentially lighted up along each scan line as currents are sequentially supplied to the each scan line. Meanwhile, when a current is not supplied to the data line under the controller even if currents are sequentially supplied along each scan line, it will be understood by those skilled in the art that a semiconductor light emitting device corresponding to a data line to which a current is not supplied is not lighted up, and the detailed description thereof will be omitted.

Moreover, a display device according to the present disclosure may drive the touch sensing unit 1110 to sequentially supply currents to a plurality of touch sensing lines arranged in column and row directions, respectively, in a frame unit, so as to sensing a touch applied to the display device. Meanwhile, the touch sensing unit 1110 is implemented to drive a touch sensing line in a column direction and a touch sensing line in a row direction at the same time so as to sense a touch at an intersection position between the touch sensing line in a column direction and the touch sensing line in a row direction.

Thus, in a display device according to the present disclosure, the display unit 1150 and touch sensing unit 1110 are driven in a frame unit, and the touch sensing unit 1110 is not driven during a period in which the display unit 1150 is driven, and on the contrary, the display unit 1150 is not driven during a period in which the touch sensing unit 1110 is driven.

As described above, in a display device according to the present disclosure, a touch sensing period is allocated to a period in which the display unit is not driven, namely, a blank time in which the screen is not turned on, thereby reducing an effect of display noise during touch sensing.

Further, the expression of "frame unit" in the present disclosure denotes a time unit required to implement one frame. For example, when a period of time of 0.001 second is required to implement one frame, the display unit 1150 and touch sensing unit 1110 may be alternately driven in an "on" state within 0.001 second.

The display unit 1150 is driven in an "on" state for a first period of time within 0.001 second, and the touch sensing unit 1110 is driven in an "on" state for a second period of time excluding the first period of time within 0.001 second. More specifically, a period of time for one frame is determined as 1 sec/number of frames. For example, the display unit configured to display 60 frames per second may have a period of time of about 16.6 millisecond (ms) per frame.

Hereinafter, in describing a driving method of the display unit 1150 and touch sensing unit 1110, for the sake of convenience of explanation, as illustrated in FIGS. 12A and 12B, it will be described on the assumption that 8 scan lines (scan1-scan8) and 8 data lines (data1-data8) are provided in the display unit 1150, and described on the assumption that 8 touch sensing lines in a row direction and 8 touch sensing lines in a column direction are provided in the touch sensing unit 1110.

As illustrated in the drawing, the display unit 1150 may include a plurality of semiconductor light emitting devices arranged to be electrically connected to a plurality of scan lines. The plurality of semiconductor light emitting devices may form a plurality of semiconductor light emitting device arrays along each scan line.

For example, as illustrated in the drawing, a plurality of semiconductor light emitting device arrays 1150a, 1150b, 1150c, 1150d, 1150e, 1150f, 1150g, 1150h may be formed along a plurality of scan lines (scan1-scan8). The semiconductor light emitting device arrays 1150a, 1150b, 1150c, 1150d, 1150e, 1150f, 1150g, 1150h may be sequentially lighted up in an array unit in response to currents sequentially applied to the plurality of scan lines (scan1-scan8). Meanwhile, as illustrated in the drawing, the touch sensing unit 1110 is disposed to overlap with semiconductor light emitting devices provided in the display unit 1150.

The touch sensing unit 1110 may include a plurality of sensing regions 1110a, 1110b, 1110c, 1110d. A boundary of the plurality of sensing regions 1110a, 1110b, 1110c, 1110d may be formed in various ways. Meanwhile, the size of a sensing region may be modified in various ways. A display device according to the present disclosure may include sense a touch to the display device through the touch sensing unit including a plurality of sensing regions 1110a, 1110b, 1110c, 1110d.

Further, as described above, a display device according to the present disclosure may perform the driving of the display unit 1150 and the driving of the touch sensing unit 1110 during different periods. In other words, when sequentially supplying currents to the plurality of scan lines (scan1-scan8) to light up the display unit 1150 is ended, the controller may supply currents to a plurality of touch sensing lines included in the touch sensing unit 1110.

Hereinafter, a display unit of the display device and a driving method of the touch sensing unit according to the present disclosure will be described in more detail with reference to the accompanying drawings. FIGS. 13, 14, 15A, 15B, 16A and 16B are conceptual view illustrating a touch sensor driving method in a display device according to the present disclosure.

In a display device according to the present disclosure, the controller drives the touch sensing unit 1110 during a first period (a) and drives the display unit 1150 during a second period (b) for each frame, and sequentially supplies currents to a plurality of scan lines to light up semiconductor light emitting devices included in a semiconductor light emitting device array disposed to correspond to each scan line.

Figure 13:
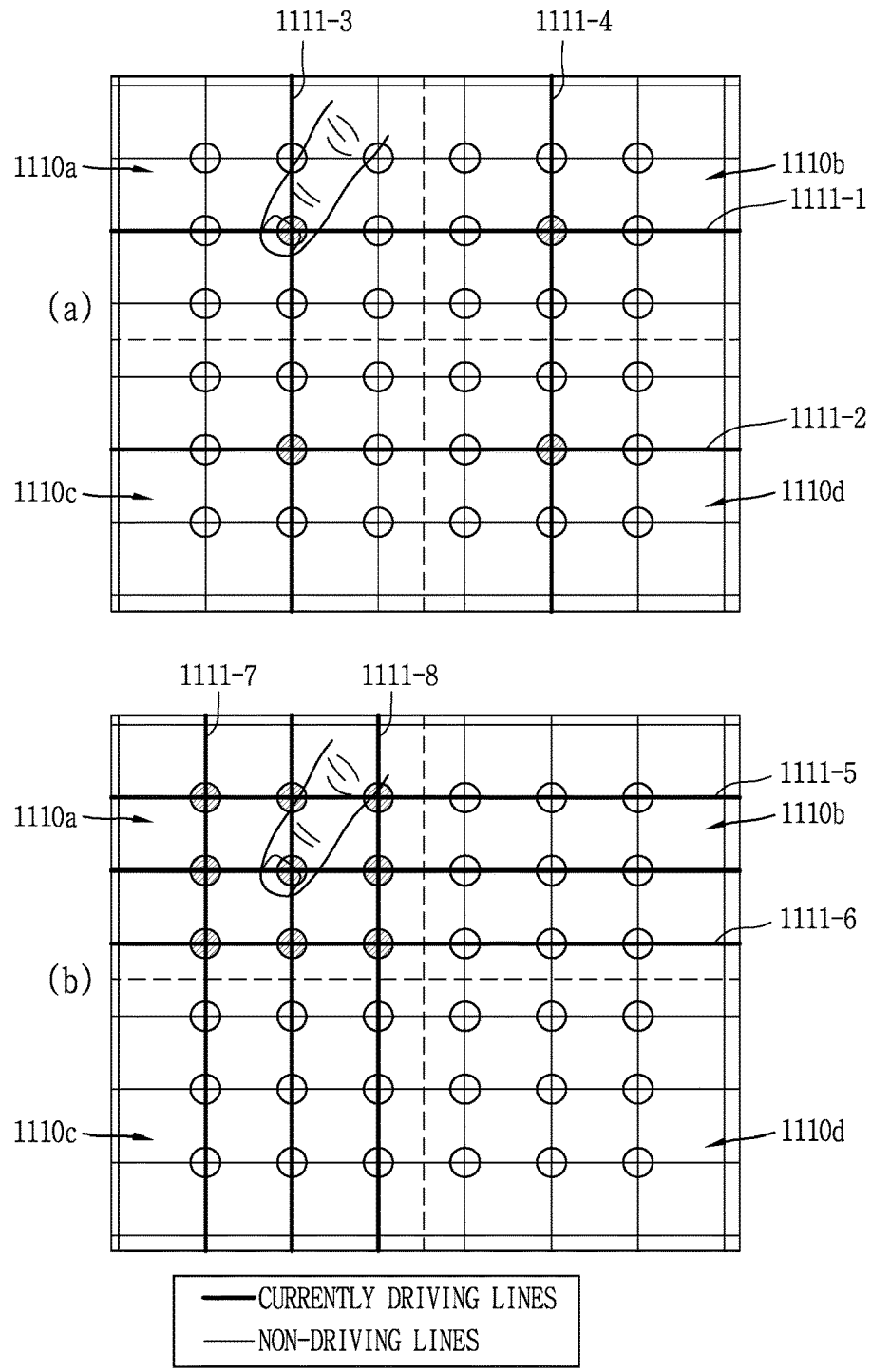
FIGS. 13, 14, 15A, 15B, 16A and 16B are conceptual view illustrating a touch sensor driving method in a display device according to the present disclosure.

Further, as illustrated in FIG. 13, in a display device according to the present disclosure, the touch sensing unit 1110 is driven in a plurality of modes. The touch sensing unit 1110 is driven in a first driving mode in which part of touch sensing lines 1111-1, 1111-2, 1111-3, 1111-4 among touch sensing lines provided in the touch sensing unit are turned on as illustrated in FIG. 13A, and a second driving mode in which at least part of touch sensing lines 1111-5, 1111-6, 1111-7, 1111-8 turned off in the first driving mode are additionally turned on when the touch input is sensed in the first driving mode as illustrated in FIG. 13B.

Figure 14:
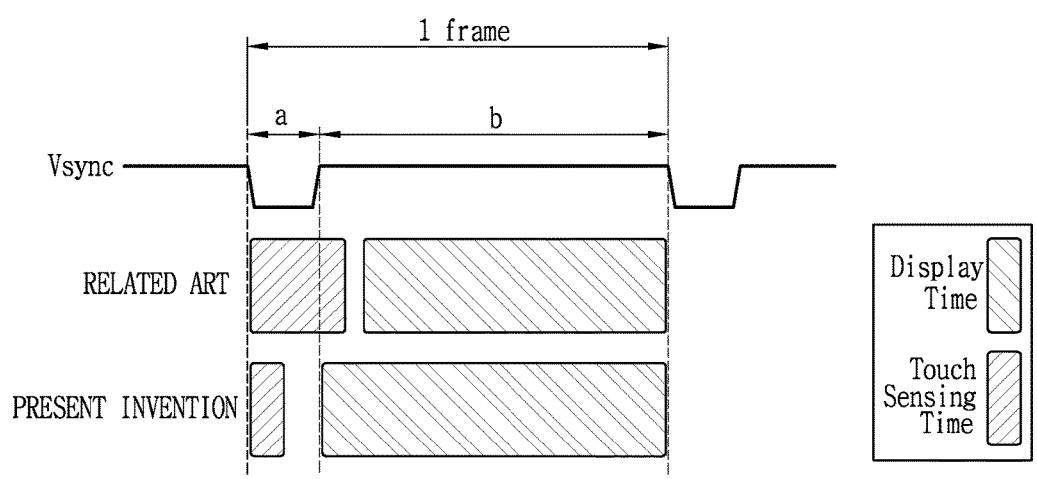

In other words, the touch sensing unit 1110 may turn on only part thereof without sequentially turning on all touch sensing lines provided in the touch sensing unit 1110 during a driving period (a) in which the touch sensing unit 1110 is driven as illustrated in FIGS. 13 and 14, thereby reducing the touch sensing time compared to a time for turning on all the touch sensing lines provided in the touch sensing unit 1110.

In this instance, a touch sensing time may be relatively decreased, and a time capable of driving the display unit in an "on" state may be relatively increased, thereby increasing the luminance of the display unit. Further, a display device according to the present disclosure may determine whether or not there is a touch input through part of touch sensing lines in a first driving mode among the driving modes of the touch sensing unit 1110, and then additionally turn on at least part of touch sensing lines turned off during a touch sensor driving period in which the touch input is sensed to detect an accurate touch coordinate of the touch input when there exists a touch input, thereby detecting the touch coordinate of the touch input.

As described above, the touch sensing unit according to the present disclosure may be driven in a first driving mode (or rough scan mode, standby driving mode) for determining whether or not there is a touch input, and a second driving mode (or fine scan mode) for recognizing a touch coordinate of the touch input sensed through the first driving mode.

Thus, during the touch sensor driving period (or first period (a)) according to the present disclosure, currents can be supplied only to part of touch sensing lines among the touch sensing lines provided in the touch sensing unit 1110, according to circumstances, without sequentially supplying currents to all the touch sensing lines provided in the touch sensing unit 1110.

Further, when a touch input is sensed in the first driving mode, the controller may drive all the touch sensing lines provided in the touch sensing unit in an "on" state to detect an accurate touch coordinate of the touch input. Moreover, according to the present disclosure, in addition to a method of driving all the touch sensing lines provided in the touch sensing unit in an "on" state, only the touch sensing lines included in a sensing region to which the touch input sensed in the first driving mode is applied among a plurality of sensing regions 1110*a*, 1110*b*, 1110*c*, 1110*d* included in the touch sensing unit may be driven in an "on" state to detect a touch coordinate.

As illustrated in FIG. 13, the controller drives part 1111-1, 1111-2, 1111-3,1111-4 of the touch sensing lines included in a plurality of sensing regions 1110*a*, 1110*b*, 1110*c*, 1110*d*, respectively, in an "on" state in the first driving mode to determine to which region a touch input is applied among a plurality of sensing regions. Further, the plurality of sensing regions, respectively, may be configured with 3×3 touch sensing lines. In other words, the each sensing region may be configured to include three touch sensing lines in a row direction and three touch sensing lines in a column direction.

Further, though not shown in the drawing, at least one touch sensing line may be disposed between each of the sensing regions. In other words, a touch sensing line that is not included in an adjacent sensing region may be disposed between each of the sensing regions. A touch sensing line (hereinafter, referred to as a "idle touch sensing line") disposed between the sensing regions may not perform a touch sensing operation.

Since a size of each touch sensor is larger than that of the unit pixel of the display unit, the touch sensor itself does not have a resolution as high as the screen resolution. Accordingly, the present disclosure perform an interpolation method for generating virtual pixels that do not exist in reality in consideration of a touch sensing amount to adjoining sensors to overcome this problem. Here, if there exists no idle touch sensing line, then a touch period may not be accurately determined when performing an interpolation method. In other words, according to the present disclosure, when an interpolation method is performed through the idle touch sensing line, it may be possible to enhance touch accuracy to each touch sensing region.

Further, the existence of the idle touch sensing line may be checked based on whether or not a signal to a pin connected between the touch sensor and the IC is periodically supplied in a display device to which a mutual method is applied. A touch sensing line disposed between the sensing regions may not perform a touch sensing operation, but in case of using such an interpolation method, it may be possible to more accurately perform a touch sensing operation.

Further, when it is determined that a touch input is applied in a first driving mode, it may be possible to detect a touch coordinate of the touch input by driving the touch sensing unit in a second driving mode, and driving all the touch sensing lines 1111-1, 1111-3, 1111-5, 1111-6, 1111-7, 1111-8 provided in the sensing region 1110*a* to which the touch input is applied among a plurality of sensing regions 1110*a*, 1110*b*, 1110*c*, 1110*d* in an "on" state. In such a case, a display device according to the present disclosure may not drive all the touch sensing lines provided in the touch sensing unit in an "on" state but partially drive them to reduce a touch sensing time. Accordingly, as illustrated in FIG. 14, according to the present disclosure, a touch sensing time may be reduced compared to the existing driving in which all the touch sensing line are driven in an "on" state, thereby relatively securing a driving time of the display unit 1150.

As described above, in a second driving mode of the touch sensing unit 1110, a touch sensing line turned off in the first driving mode among touch sensing lines included in the detected sensing region is additionally turned on. Furthermore, the controller detects a touch coordinate of the touch input applied to the detected sensing region based on sensing information sensed through a touch sensing line included in the detected sensing region in the second driving mode.

Further, when the detection of a touch coordinate corresponding to the touch input applied to the detected sensing region is completed, the controller may end the driving of a sensing region to which the touch input is applied in a second driving mode, and drive the touch sensing unit 1110 again in a first driving mode in which only part of the touch sensing lines are driven in an "on" state.

Further, the controller may not process a touch to the remaining sensing regions excluding a sensing region driven in the second driving mode while executing the second driving mode. Not processing a touch to the remaining sensing regions may be algorithmically designed and thus program codes may exist on the display device. Meanwhile, not processing a touch to the remaining sensing regions is to reduce a touch sensing time.

Further, as illustrated in FIG. 13B, the controller may continuously drive the remaining sensing regions 1110*b*, 1110*c*, 1110*d* in a first driving mode to sense a touch input to the remaining sensing regions 1110*b*, 1110*c*, 1110*d* in an independent manner from the sensing region 1110*a* to which a touch input is applied in a first driving mode being driven in a second driving mode on the touch sensing unit 1110. In other words, the controller may continuously maintain touch sensing lines among touch sensing lines included in the remaining sensing regions 1110*b*, 1110*c*, 1110*d*, respectively, thereby determining whether or not there is a touch to the remaining sensing regions.

Further, the touch sensing unit 1110 is continuously operated in a first driving mode in which the part of touch sensing lines are driven in an "on" state until prior to sensing the touch input through the part of touch sensing lines turned on in the first driving mode. In other words, a second driving mode is executed only when a touch input to at least one region of a plurality of sensing regions is applied. Meanwhile, when a touch input to a plurality of regions is sensed in a first driving mode, all the plurality of sensing regions are driven in a second driving mode. In addition, touch sensing lines included in the plurality of sensing regions, respectively, may be all driven in an "on" state.

Further, according to a display device according to the present disclosure, the touch sensing unit may be operated in largely two different schemes such as a first driving mode and a second driving mode. First, according to the first scheme, as illustrated in FIGS. 15A and 15B, the first and the second driving mode may be executed in different frames, respectively.

Figure 15A:
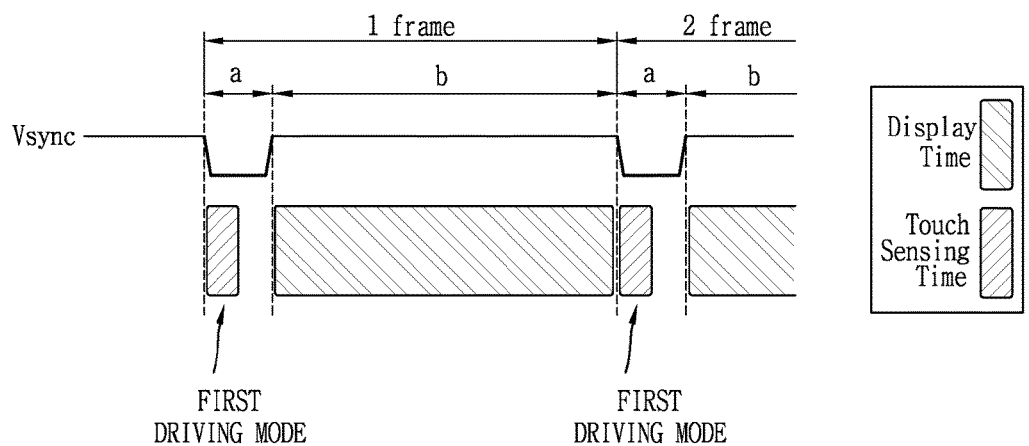
Figure 15B:
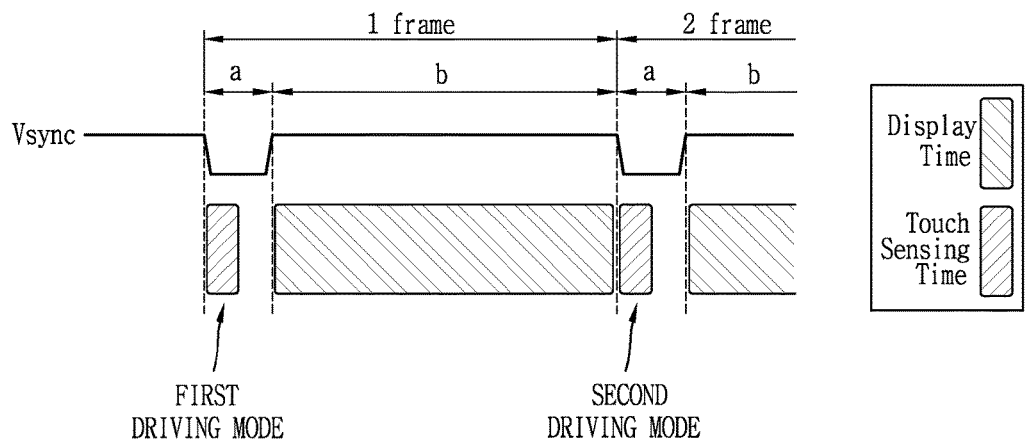

For example, as illustrated in FIG. 15A, the display device may include a first period (a) in which the touch sensing unit 1110 is driven and a second period (b) in which the display unit 1150 is driven, and the touch sensing unit 1110 may be driven in the first period (a) of each frame. Furthermore, the touch sensing unit 1110 may be driven in a first driving mode during the first period (a) of each frame until a touch input is sensed. Moreover, when a touch input is sensed to at least one sensing region among a plurality of sensing regions while the touch sensing unit 1110 is driven in the first driving mode, the controller 180 can drive the touch sensing unit in a second driving mode during a second frame following the first frame driven in the first driving mode as illustrated in FIG. 15B.

In addition, the controller may drive a sensing region in which a touch input is sensed among the plurality of sensing regions in a second driving mode. In other words, according to the present disclosure, a sensing region excluding the sensing region in which a touch input is sensed may be driven in a first driving mode, thereby reducing the touch sensing time.

Further, a sensing region in which a touch input is sensed may be recognized through sensing information via touch sensing lines driven in an "on" state in a first driving mode.

Thus, according to a first scheme, the controller drives the touch sensing unit in an "on" state, and drives the display unit in an "off" state during a first period (a) in a frame unit, and drives the touch sensing unit in an "off" state, and drives the display unit in an "on" state during a second period (b) different from the first period (a). Furthermore, when the touch input is sensed while the touch sensing unit is driven in the first driving mode during the first period (a), the controller drives the touch sensing unit in a second driving mode during a first period of a second frame following a first frame in which the touch input is sensed to detect a touch coordinate of the touch input. In a second driving mode, touch sensing lines included in a sensing region in which a touch input is sensed are all driven in an "on" state, and only part of touch sensing lines included in a sensing region in which the touch input is not sensed are driven in an "on" state.

Further, in a second frame, the touch sensing unit is operated only in a second driving mode, and in this instance, the touch sensing unit may not be operated in a first driving mode. Accordingly, in this instance, information on one touch for two frames may be acquired. In other words, one touch may produce an accurate touch coordinate throughout two frames. More specifically, information on a region to which a touch is applied may be acquired during a first frame, and the touch coordinate information of the touch may be acquired during a second frame.

A touch may not be processed in the remaining sensing regions when the second driving mode is performed. Further, when a touch input is not sensed on the touch sensing unit, the controller continuously drive the touch sensing unit in the first driving mode during the first period (a) as illustrated in FIG. 15A.

Figure 16A:
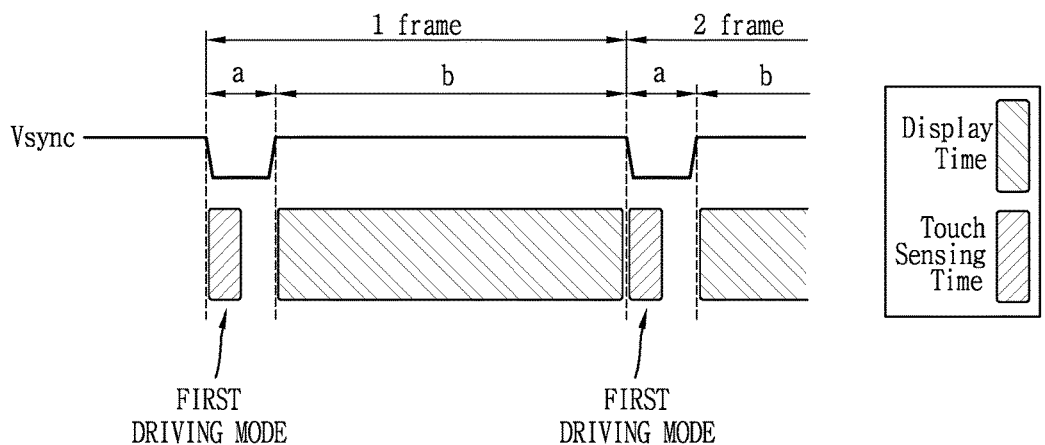
Figure 16B:
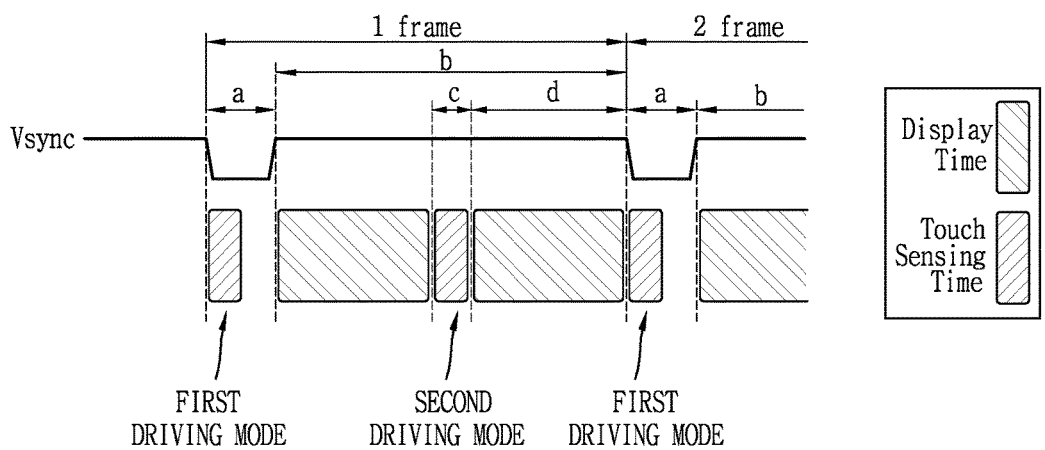

Next, a display device according to the present disclosure may operate the touch sensing unit in a first driving mode and a second driving mode using the second scheme according to FIGS. 16A and 16B. According to the second scheme, as illustrated in the drawing, a first and a second driving mode may be performed within one frame.

First, the controller may drive the touch sensing unit 1110 in an "on" state, and drive the display unit 1150 in an "off" state during a first period (a) in a frame unit, and drive the touch sensing unit in an "off" state, and drive the display unit in an "on" state during a second period (b) different from the first period (a). As illustrated in FIG. 16A, until prior to sensing a touch input, the display unit is sequentially driven in an "on" state during the first and the second period (a, b), respectively.

Furthermore, when a touch input is sensed while the touch sensing unit 1110 is driven in the first driving mode during the first period (a), the controller may control the touch sensing unit 1110 and display unit 1150 to detect a touch coordinate of the touch input during the second period in which the display unit 1150 is driven within a frame in which the touch input is sensed. In other words, when a touch input is sensed during the first period (a), the controller uses the second period (b), which is a driving period of the display unit 1150, to detect a touch coordinate of the sensed touch input within a frame in which the touch input is sensed.

In addition, the controller may end the driving of the display unit 1150 during the second period (b), and drives the touch sensing unit 1110 in a second driving mode during a partial period (c) of the second period (b) to detect a touch coordinate of the touch input as illustrated in FIG. 16B. Furthermore, the controller may drive the display unit 1150 again during the remaining period (d) of the second period (b) subsequent to ending the detection of the touch coordinate. During the remaining period (d), the touch sensing unit 1110 is driven in an "off" state.

In other words, the controller drives the display unit 1150 in an "off" state while the touch sensing unit 1110 is driven in an "on" state during the second period (b), and switches the touch sensing unit 1110 to an "off" state during the remaining period (d) of the second period (b) when the detection of the touch coordinate is completed during the second period (b), and drives the display unit 1150 in an "on" state again. Thus, when the detection of a touch input and the detection of a touch coordinate are performed at the same time within one frame, it may be possible to enhance the touch response speed.

Further, when a touch input is not sensed during a frame following the frame, as illustrated in FIG. 16A, the display unit 1150 and touch sensing unit 1110 may be driven. As described above, a display device according to the present disclosure may include a first driving mode in which only part of touch sensing lines of the touch sensing unit are turned on, and a second driving mode in which the touch sensing lines of a portion corresponding to a region in which a touch input is sensed are all turned on to detect a touch coordinate of the touch input when the touch input is sensed.

Accordingly, only part of touch sensing line may be driven in an "on" state while the touch sensing unit is operated in a first driving mode, and thus a touch sensing time at this time may be reduced compared to a touch sensing time at the time when touch sensing lines are all driven. As the touch sensing time is reduced, a time of driving the display unit in an "on" state may be increased, thereby increasing the luminance of the display unit.

Further, in case of the present disclosure, a touch sensing time as much as $1/8$ to the maximum may be required compared to a touch sensing time according to a touch sensing method in the related art. Furthermore, when only part of touch sensing lines are driven in an "on" state as described above, a touch sensing time may be relatively reduced, thereby solving a problem of increasing the touch sensing time in proportion to an increase of the resolution of a display panel.

What is claimed is:

1. A display device, comprising:
a display including a plurality of semiconductor light emitting devices;
a touch sensor including touch sensing lines disposed to overlap with the plurality of semiconductor light emitting devices, and arranged to cross each other to sense a touch input; and
a controller configured to:
sequentially drive the touch sensor to sense a touch input and the display to control the semiconductor light emitting devices,
wherein the controller drives the touch sensor during a first period and drives the display during a second period for each frame,
wherein a driving mode of the touch sensor comprises:
a first driving mode in which a part of the touch sensing lines are turned on and a remaining part of the touch sensing lines are turned off, and
a second driving mode in which the remaining part of the touch sensing lines turned off in the first driving mode are additionally turned on,
wherein:
when a touch input is sensed in a state where the touch sensor is driven as the first driving mode in a first period of a first frame, the controller drives the touch sensor to drive as the second driving mode in a first period of a second frame following the first frame, and
when the touch input is not sensed in a state where the touch sensor is driven as the first driving mode in the first period of the first frame, the controller drives the touch sensor to drive as the first driving mode in the first period of the second frame following the first frame.

2. The display device of claim 1, wherein the touch sensor includes a plurality of sensing regions, and
wherein the controller is further configured to detect a sensing region to which a touch input is applied among the plurality of sensing regions using the part of the touch sensing lines turned on in the first driving mode.

3. The display device of claim 2, wherein the controller is further configured to:
turn on touch sensing lines turned off in the first driving mode among touch sensing lines included in the detected sensing region in the second driving mode, and
detect a touch coordinate of the touch input applied to the detected sensing region based on sensing information sensed through a touch sensing line included in the detected sensing region in the second driving mode.

4. The display device of claim 3, wherein the touch sensor ends an operation according to the second driving mode, and is driven in the first driving mode when the detection of a touch coordinate corresponding to the touch input applied to the detected sensing region is completed.

5. The display device of claim 2, wherein the plurality of sensing regions, respectively, include a plurality of touch sensing lines, and
wherein the controller is further configured to turn on part of the touch sensing lines included in the plurality of sensing regions, respectively, and turn off another part thereof.

6. The display device of claim 5, wherein the controller is further configured to drive the touch sensing lines included in a sensing region to which the touch input is applied among the plurality of sensing regions in an "on" state.

7. The display device of claim 6, wherein the controller is further configured to continuously maintain part of touch sensing lines driven in an "on" state in the first driving mode among touch sensing lines included in the remaining sensing regions, respectively, in the "on" state, and sense a touch input applied to the remaining sensing regions excluding a sensing region to which the touch input is applied, in the second driving mode.

8. The display device of claim 1, wherein the controller is further configured to continuously operate the touch sensor in the first driving mode in which only the part of the touch sensing lines are driven in an "on" state until prior to sensing the touch input through the part of the touch sensing lines turned on in the first driving mode.

9. The display device of claim 1, wherein the controller is further configured to:
drive the touch sensor in an "on" state and drive the display in an "off" state during a first period in a frame unit, and drive the touch sensor in an "off" state and drive the display in an "on" state during a second period different from the first period, and
when the touch input is sensed while the touch sensor is driven in the first driving mode during the first period, drive the touch sensor in a second driving mode during a first period of the second frame following the first frame in which the touch input is sensed to detect a touch coordinate of the touch input.

10. The display device of claim 9, wherein when the touch input is not sensed, the controller is further configured to continuously drive the touch sensor in the first driving mode during the first period.

11. A method of controlling a display device including a display having a plurality of semiconductor light emitting devices; and a touch sensor including touch sensing lines disposed to overlap with the plurality of semiconductor light emitting devices, and arranged to cross each other to sense a touch input, the method comprising:
sequentially driving, via a controller of the display device, the touch sensor to sense a touch input and the display to control the semiconductor light emitting devices,
wherein the controller drives the touch sensor during a first period and drives the display during a second period for each frame,
wherein a driving mode of the touch sensor comprises:
a first driving mode in which a part of the touch sensing lines are turned on and a remaining part of the touch sensing lines are turned off, and
a second driving mode in which the remaining part of touch sensing lines turned off in the first driving mode are additionally turned on,
wherein:
when a touch input is sensed in a state where the touch sensor is driven as the first driving mode in a first period of a first frame, the controller drives the touch sensor to drive as the second driving mode in a first period of a second frame following the first frame, and
when the touch input is not sensed in a state where the touch sensor is driven as the first driving mode in the first period of the first frame, the controller drives the touch sensor to drive as the first driving mode in the first period of the second frame following the first frame.

12. The method of claim 11, wherein the touch sensor includes a plurality of sensing regions, and
wherein the method further comprising detecting a sensing region to which a touch input is applied among the plurality of sensing regions using the part of the touch sensing lines turned on in the first driving mode.

13. The method of claim 12, further comprising:

turning on, via the controller, touch sensing lines turned off in the first driving mode among touch sensing lines included in the detected sensing region in the second driving mode; and detecting, via the controller, a touch coordinate of the touch input applied to the detected sensing region based on sensing information sensed through a touch sensing line included in the detected sensing region in the second driving mode.

14. The method of claim 13, wherein the touch sensor ends an operation according to the second driving mode, and is driven in the first driving mode when the detection of a touch coordinate corresponding to the touch input applied to the detected sensing region is completed.

15. The method of claim 12, wherein the plurality of sensing regions, respectively, include a plurality of touch sensing lines, and wherein the method further comprises turning on part of the touch sensing lines included in the plurality of sensing regions, respectively, and turning off another part thereof.

16. The method of claim 15, further comprising:

driving the touch sensing lines included in a sensing region to which the touch input is applied among the plurality of sensing regions in an "on" state.

17. The method of claim 16, further comprising:

continuously maintaining part of touch sensing lines driven in an "on" state in the first driving mode among touch sensing lines included in the remaining sensing regions, respectively, in the "on" state, and sensing a touch input applied to the remaining sensing regions excluding a sensing region to which the touch input is applied, in the second driving mode.

18. The method of claim 11, further comprising:

continuously operating the touch sensor in the first driving mode in which only the part of the touch sensing lines are driven in an "on" state until prior to sensing the touch input through the part of the touch sensing lines turned on in the first driving mode.

* * * * *